(12) United States Patent
Ji et al.

(10) Patent No.: US 12,245,215 B2
(45) Date of Patent: Mar. 4, 2025

(54) METHOD FOR DATA TRANSMISSION THROUGH SCHEDULING A CARRIER, USER EQUIPMENT, AND CONTROL NODE

(71) Applicant: VIVO MOBILE COMMUNICATION CO.,LTD., Guangdong (CN)

(72) Inventors: Zichao Ji, Guangdong (CN); Siqi Liu, Guangdong (CN)

(73) Assignee: VIVO MOBILE COMMUNICATION CO.,LTD., Guangdong (CN)

( * ) Notice: Subject to any disclaimer, the term of this patent is extended or adjusted under 35 U.S.C. 154(b) by 398 days.

(21) Appl. No.: 17/585,291

(22) Filed: Jan. 26, 2022

(65) Prior Publication Data

US 2022/0150908 A1  May 12, 2022

Related U.S. Application Data

(63) Continuation of application No. PCT/CN2020/104920, filed on Jul. 27, 2020.

(30) Foreign Application Priority Data

Jul. 29, 2019 (CN) .......................... 201910690842.7

(51) Int. Cl.
*H04W 72/12* (2023.01)

(52) U.S. Cl.
CPC .................... *H04W 72/12* (2013.01)

(58) Field of Classification Search
CPC ............................ H04W 72/12; H04L 5/001
See application file for complete search history.

(56) References Cited

U.S. PATENT DOCUMENTS

| | | | |
|---|---|---|---|
| 2019/0387501 A1* | 12/2019 | Park | H04L 5/005 |
| 2020/0077434 A1 | 3/2020 | Kim et al. | |
| 2020/0296749 A1 | 9/2020 | Freda et al. | |
| 2020/0296796 A1 | 9/2020 | Uchiyama et al. | |
| 2020/0389257 A1* | 12/2020 | Kung | H04W 4/06 |
| 2020/0403737 A1* | 12/2020 | Yeo | H04L 1/1861 |
| 2021/0185720 A1 | 6/2021 | Andersson et al. | |

FOREIGN PATENT DOCUMENTS

| | | |
|---|---|---|
| CN | 108886498 A | 11/2018 |
| CN | 109196933 A | 1/2019 |
| CN | 109246659 A | 1/2019 |
| WO | 2018/084524 A1 | 5/2018 |
| WO | 2018174661 A1 | 9/2018 |

(Continued)

OTHER PUBLICATIONS

EESR issued by the EPO for Application No. EP 20846534, dated Aug. 1, 2022.

(Continued)

*Primary Examiner* — Gary Mui
*Assistant Examiner* — Yewon Kim
(74) *Attorney, Agent, or Firm* — IP & T GROUP LLP

(57) ABSTRACT

A data transmission method includes: transmitting, in a carrier aggregation scenario based on scheduling information, sidelink data on a data carrier and feedback data on a feedback carrier. The scheduling information is used to schedule the data carrier and/or the feedback carrier, and the feedback data is used to indicate a transmission result of the sidelink data.

19 Claims, 4 Drawing Sheets

Transmit, by UE in a carrier aggregation scenario based on scheduling information, sidelink data on a data carrier — 201

Transmit, by the UE based on the scheduling information, feedback data on a feedback carrier — 202

(56) References Cited

FOREIGN PATENT DOCUMENTS

| WO | 2018177109 A1 | 10/2018 |
| WO | 2019/012041 A1 | 1/2019 |
| WO | 2019/023857 A1 | 2/2019 |
| WO | 2019/064983 A1 | 4/2019 |

OTHER PUBLICATIONS

Reconsideration on sidelink HARQ entity and sidelink process in PC5 CA, 3GPP TSG-RAN WG2 Meeting #100, Nov. 27-Dec. 1, 2017, p. 1-5, R2-1712750, Huawei, HiSilicon, Reno, USA.
The First Office Action of Priority Application No. CN 201910690842.7 issued by the Chinese Patent Office on Mar. 8, 2021.
The Second Office Action of Priority Application No. CN 201910690842.7 issued by the Chinese Patent Office on Dec. 3, 2021.
International Search Report and Written Opinion of International Application No. PCT/CN2020/104920 issued by the Chinese Patent Office on Oct. 28, 2020.

* cited by examiner

METHOD FOR DATA TRANSMISSION THROUGH SCHEDULING A CARRIER, USER EQUIPMENT, AND CONTROL NODE

CROSS-REFERENCE TO RELATED APPLICATIONS

This application is a Bypass Continuation Application of PCT/CN2020/104920 filed on Jul. 27, 2020, which claims priority to Chinese Patent Application No. 201910690842.7 filed on Jul. 29, 2019, which are incorporated herein by reference in their entirety.

TECHNICAL FIELD

Embodiments of the present disclosure relate to the field of communications technologies, and in particular, to a data transmission method, a user equipment, and a control node.

BACKGROUND

A 5G NR (NR) system of Release-16 supports configuration for only single-carrier sidelink transmission, but does not support configuration for multi-carrier sidelink transmission. However, some sidelink transmission services may need carrier aggregation-based (CA) sidelink transmission, namely, sidelink transmission on a plurality of carriers. In a case that a plurality of NR sidelink single carriers are used for CA transmission, a design of a single-carrier sidelink is simply reused for each carrier, that is, each carrier independently performs sensing and resource allocation. As a result, multi-carrier transmission fails.

For example, transmit-end user equipment (UE) respectively allocates resources on two carriers (CC1 and CC2) for CA-based multicast sidelink transmission. In this case, in a case that receive-end UE monitors only CC1, but does not monitor CC2, whether multicast sidelink transmission is performed on CC2 cannot be learned. As a result, sidelink transmission on CC2 cannot be received. Further, negative acknowledgement (NACK) feedback cannot be sent on CC2. Because the transmit-end UE does not receive NACK feedback on CC2, the transmit-end UE mistakenly considers that all receive-end UE successfully receives multicast sidelink transmission. As a result, multicast sidelink transmission fails.

Therefore, how to implement sidelink feedback transmission in the carrier aggregation scenario becomes a problem needing to be urgently solved.

SUMMARY

According to a first aspect, an embodiment of the present disclosure provides a data transmission method, applied to UE and including: transmitting, in a carrier aggregation scenario based on scheduling information, sidelink data on a data carrier and feedback data on a feedback carrier, where the scheduling information is used to schedule the data carrier and/or the feedback carrier, and the feedback data is used to indicate a transmission result of the sidelink data.

According to a second aspect, an embodiment of the present disclosure provides a data transmission method, applied to a control node and including: sending scheduling information to user equipment UE, where the scheduling information is used to schedule a data carrier in a carrier aggregation scenario to transmit sidelink data, and/or the scheduling information is further used to schedule a feedback carrier to transmit feedback data; and the feedback data is used to indicate a transmission result of the sidelink data.

According to a third aspect, an embodiment of the present disclosure provides a UE, including a transmitting module, where the transmitting module is configured to: transmit, in a carrier aggregation scenario based on scheduling information, sidelink data on a data carrier and feedback data on a feedback carrier, where the scheduling information is used to schedule the data carrier and/or the feedback carrier, and the feedback data is used to indicate a transmission result of the sidelink data.

According to a fourth aspect, an embodiment of the present disclosure provides a network node, including a sending module, where the sending module is configured to send scheduling information to user equipment UE, where the scheduling information is used to schedule a data carrier in a carrier aggregation scenario to transmit sidelink data, and/or the scheduling information is further used to schedule a feedback carrier to transmit feedback data; and the feedback data is used to indicate a transmission result of the sidelink data.

According to a fifth aspect, an embodiment of the present disclosure provides UE, including a processor, a memory, and a computer program stored in the memory and executable on the processor. When the computer program is executed by the processor, the steps of the data transmission method according to the first aspect is implemented.

According to a sixth aspect, an embodiment of the present disclosure provides a network node, including a processor, a memory, and a computer program stored in the memory and executable on the processor, When the computer program is executed by the processor, the steps of the data transmission method according to the second aspect is implemented.

According to a seventh aspect, an embodiment of the present disclosure provides a non-transitory computer-readable storage medium. The non-transitory computer-readable storage medium stores a computer program, and when the computer program is executed by a processor, the steps of the foregoing data transmission method is implemented.

DETAILED DESCRIPTION OF EMBODIMENTS

Figure 1:
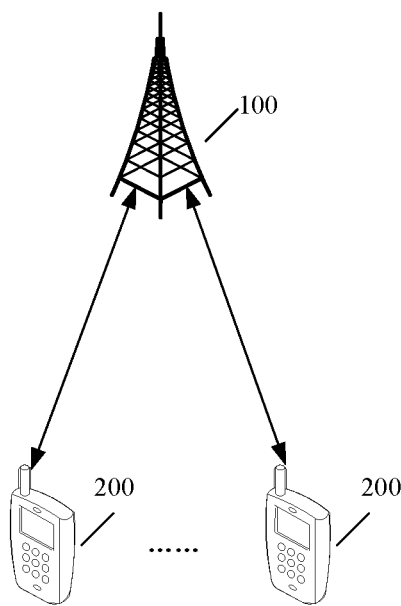
FIG. 1 is a possible schematic structural diagram of a communications system according to an embodiment of the present disclosure.

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

It should be noted that "/" in the embodiments of the present disclosure represents or. For example, A/B may indicate A or B; and "and/or" in this specification merely describes an association relationship between associated objects, and indicates that there may be three relationships. For example, A and/or B may indicate three cases: only A exists, both A and B exist, and only B exists.

It should be noted that, in order to clearly describe the technical solutions in the embodiments of the present disclosure, in the embodiments of the present disclosure, the terms such as "first" and "second" are used to distinguish same or similar items with a basically same function or effect. A person skilled in the art can understand that the terms such as "first" and "second" do not limit a quantity and an execution order. For example, first carrier indication information and second carrier indication information are intended to distinguish between different carrier indication information, and are not used to describe a particular order of the carrier indication information.

It should be noted that in this embodiment of the present disclosure, the term such as "exemplary" or "for example" is used for representing an example, an illustration, or a description. Any embodiment or design scheme described as an "example" or "for example" in the embodiments of the present disclosure should not be explained as being more preferred or having more advantages than another embodiment or design scheme. To be precise, the use of the term such as "exemplary" or "for example" is intended to present a related concept in a specific manner.

It should be noted that, in this embodiment of the present disclosure, "of", "relevant", and "corresponding" may be used in a mixed manner. It should be noted that, when a difference is not emphasized, meanings to be expressed by them are the same. In the embodiments of the present disclosure, "a plurality of" means two or more.

The data transmission method provided in this embodiment of the present disclosure may be applied to a sidelink transmission scenario, such as a sidelink data transmission scenario or a sidelink data feedback scenario.

Currently, a long term evolution (LTE) system supports sidelink transmission, that is, user equipment (UE) may perform direct data transmission with each other on a physical layer. An LTE sidelink performs communication based on a broadcast mode. Although being applicable to basic safety-related communication that supports vehicle to everything (V2X), the LTE sidelink is inapplicable to other V2X services of a higher level. A 5G NR (NR) system supports a more advanced sidelink transmission design, such as, a unicast design, a multicast design, or a broadcast design, thereby supporting services of more comprehensive types.

The LTE system starts to support sidelink from the Release 12, for performing data transmission between UE directly instead of through a network device. The UE sends sidelink control information SCI through a physical sidelink control channel (PSCCH), and sends sidelink data by scheduling transmission of a physical sidelink shared channel (PSSCH). The data transmission is in the form of broadcast, and a receive end does not respond to a transmit end whether reception is successful.

In addition, a sidelink design in an LTE system supports two resource allocation modes: a scheduled resource allocation mode and an autonomous resource selection mode. The scheduled resource allocation mode is controlled by the network device and allocates resources for each UE. For the autonomous resource selection mode, the resource is selected by the UE autonomously.

Starting from the Release 15, LTE supports sidelink carrier aggregation (CA). A CA interface and a Uu interface (a downlink and an uplink) of the LTE sidelink are different, and the LTE sidelink has no distinction between a primary component carrier (PCC) and a secondary component carrier (SCC). The UE in the autonomous resource selection mode independently performs resource sensing, resource reservation, and resource allocation on each component carrier (CC).

The design of the LTE sidelink is suitable for specific public safety affairs (such as emergency communication in a fire disaster place or an earthquake disaster place), or vehicle to everything (V2X) communication. Vehicle to everything communication includes various services, for example, basic safety-related communication, advanced driving (autonomous driving), formation, and sensor extension. Because the LTE sidelink supports only broadcast communication, the LTE sidelink is mainly used for basic safety-related communication, and another advanced V2X service is supported by using an NR sidelink.

A 5G NR system starts to support sidelink from the Release 16, and can be used in an operating frequency band above 6 GHz that the LTE system does not support, thereby supporting higher operating bandwidth. The NR sidelink supports multiple transmission modes such as unicast, multicast, and broadcast, and supports hybrid automatic repeat request HARQ) in the unicast and multicast modes. A response to the HARQ is sent by using a physical sidelink feedback channel (PSFCH). In addition, the NR sidelink also supports a plurality of resource allocation modes, for example, a base station scheduling mode, an autonomous resource selection mode of UE, or a mode in which UE transfers a configuration to other UE.

A current NR sidelink multicast supports two use cases: connection-based multicast and connectionless multicast. Connection-based multicast means that a connection is established between UE in multicast. Connectionless multicast means that multicast UE does not know other UE in multicast and no connection is established. For HARQ feedback multicast, an NR sidelink supports two modes: an ACK/NACK feedback mode and a NACK-only feedback mode. The ACK/NACK feedback mode means that each receive-end UE in multicast independently sends an ACK or a NACK to feed back whether reception succeeds or fails. This mode is suitable for connection-based multicast scenarios. NACK-only feedback means that each receive-end UE in multicast sends a NACK feedback only when reception fails (no feedback is sent when the reception succeeds). NACK feedbacks are sent on the same resource (thus, transmit-end UE considers, when receiving only one NACK feedback, that there is UE failing the reception, and considers, when receiving none NACK feedback, that there is UE succeeding the reception), which is suitable for connectionless multicast scenarios.

In this way, a 5G NR sidelink system currently supports configuration for only single-carrier sidelink transmission, but does support configuration for multi-carrier sidelink transmission. However, an LTE sidelink that supports multi-carrier transmission does not support unicast, multicast, HARQ feedback, and the like. In a case that a plurality of NR sidelink single carriers are used for CA transmission, a design of a current sidelink is simply reused for each carrier, that is, each carrier independently performs sensing and resource allocation. As a result, multi-carrier transmission fails.

To resolve the foregoing problem, an embodiment of the present disclosure provides a data transmission method, which can instruct UE based on scheduling information to transmit sidelink data on a plurality of carriers, thereby implementing unicast, multicast, or broadcast CA transmission on a sidelink. In addition, the method can instruct UE based on scheduling information to transmit, on one or more feedback carriers, feedback data that is transmitted in sidelink data, thereby enabling a sidelink to support HARQ feedback, such as an ACK-only feedback mode.

The technical solutions provided in this embodiment of the present disclosure may be applied to various communications systems, for example, a 5G communications system, a future evolved system, an LTE communications system, a VOLTE communications system, or a plurality of communications fusion systems. A plurality of application scenarios may be included, for example, machine-to-machine (M2M), D2M, macro-micro communication, enhanced mobile broadband (eMBB), ultra-reliable and low latency communications (uRLLC), and massive machine type communication (mMTC). These scenarios include but are not limited to scenarios such as communication between terminal devices, communication between network devices, or communication between a network device and a terminal device. The embodiments of the present disclosure may be applied to communication between a network device and a terminal device in the 5G communications system, communication between terminal devices, or communication between network devices.

FIG. 1 is a possible schematic structural diagram of a communications system according to an embodiment of the present disclosure. As shown in FIG. 1, the communications system includes at least one network device 100 (only one network device is shown in FIG. 1) and one or more terminal devices 200 connected to each network device 100.

The network device 100 may be a base station, a core network device, a transmission and reception point (TRP), a relay station, an access point, or the like. The network device 100 may be a base transceiver station (BTS) in a global system for mobile communication (GSM) or a code division multiple access (CDMA) network, may be an NB (NodeB) in wideband code division multiple access (WCDMA), or may be an eNB or an eNodeB (evolutional NodeB) in LTE. The network device 100 may be alternatively a wireless controller in a cloud radio access network (CRAN) scenario. The network device 100 may also be a network device in the 5G communications system or a network device in a future evolved network, for example, a base station, a road side unit RSU), or a relay node (namely relay). However, the term used does not constitute a limitation to the embodiments of the present disclosure.

The terminal device 200 may be a wireless terminal device or a wired terminal device. The wireless terminal device may be a device that provides voice and/or other service data connectivity for a user, a handheld device with a wireless communication function, a computing device, another processing device connected to a wireless modem, an in-vehicle device, a wearable device, a terminal device in a future 5G network, a terminal device in a future evolved PLMN network, or the like. The wireless terminal device may communicate with one or more core networks by using a radio access network (RAN). The wireless terminal device may be a mobile terminal device, such as a mobile phone (or referred to as a "cellular" phone) and a computer with a mobile terminal device. For example, the wireless terminal device may be a portable, pocket-sized, handheld, computer built-in, or in-vehicle mobile apparatus that exchanges voice and/or data with a radio access network, and/or a device such as a personal communication service (PCS) phone, a cordless phone, a session initiation protocol (SIP) phone, a wireless local loop (WLL) station, or a personal digital assistant (PDA). The wireless terminal device may be alternatively a mobile device, user equipment (UE), a UE terminal device, an access terminal device, a wireless communications device, a terminal device unit, a terminal device station, a mobile station, a mobile console (Mobile), a remote station, a remote terminal, a subscriber unit, a subscriber station, a user agent, a terminal device apparatus, or the like. In the following embodiments, an example in which the terminal device is UE is used for description.

For example, the data transmission method provided in this embodiment of the present disclosure may be applied to a 5G NR system. A control node may interact with UE, to support sidelink data transmission between UE. The control node may be a network device or UE that controls other UE on a sidelink. In an example, in this embodiment of the present disclosure, an example in which the terminal device is UE, for example, a mobile phone is shown in FIG. 1.

An embodiment of the present disclosure provides a data transmission method. The data transmission method may include step 10.

Step 10: UE transmits, in a carrier aggregation scenario based on scheduling information, sidelink data on a data carrier and feedback data on a feedback carrier, where the scheduling information is used to schedule the data carrier and/or the feedback carrier, and the feedback data is used to indicate a transmission result of the sidelink data.

Figure 2:
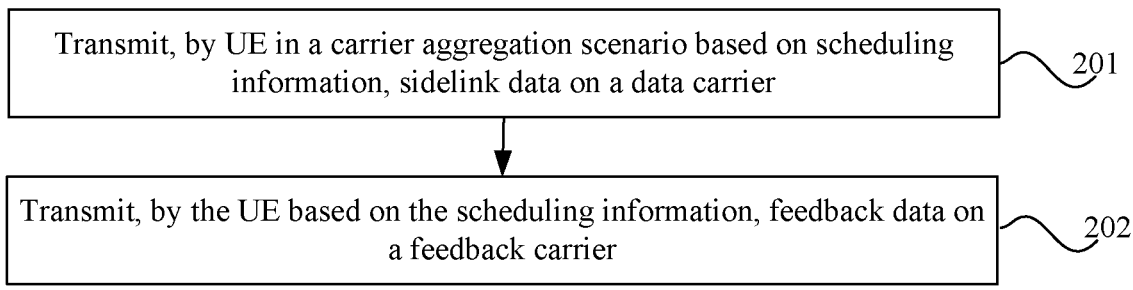
FIG. 2 is a first schematic flowchart of a data transmission method according to an embodiment of the present disclosure.

For example, FIG. 2 is a schematic flowchart of a data transmission method according to an embodiment of the present disclosure. As shown in FIG. 2, the data transmission method may include step 201 and step 202.

Step 201: UE transmits, in a carrier aggregation scenario based on scheduling information, sidelink data on a data carrier.

Step 202: The UE transmits, based on the scheduling information, feedback data on a feedback carrier.

Optionally, in a carrier aggregation scenario, the foregoing data carrier may be a plurality of carriers, namely, a carrier using CA, for example, 2 CC or 3 CC. For example, the data carrier used for transmitting the sidelink data between UE may be a plurality of carriers.

Optionally, a scheduling carrier carrying the scheduling information is different from a part of or all of data carriers, or the scheduling carrier is the same as the data carrier.

In this embodiment of the present disclosure, the UE may schedule, on the data carrier, transmission of the sidelink data via intra-carrier scheduling or inter-carrier scheduling.

Optionally, in this embodiment of the present disclosure, the foregoing scheduling information includes at least one of first scheduling information or second scheduling information. The first scheduling information is used to schedule the data carrier, and the second scheduling information is used to schedule the feedback carrier.

In a case that the UE schedules transmission of the sidelink data on the data carrier via intra-carrier scheduling, the scheduling carrier that carries the scheduling information (for example, the second scheduling information) is the same as the data carrier.

In an intra-carrier scheduling scenario, the UE may independently perform operations such as resource sensing, reservation, and allocation on each carrier. For example, the UE may allocate resources on each data carrier for carrying a PSCCH, and then transmit, through the PSCCH, scheduling information, for example, SCI in the scheduling information. For example, a data carrier may be a scheduling carrier.

Optionally, the UE schedules transmission of the sidelink data on the data carrier via inter-carrier scheduling, the scheduling carrier that carries the scheduling information (for example, the second scheduling information) is different from a part of or all of the data carriers.

In an inter-carrier scheduling scenario, the UE senses, reserves, and allocates, on one or more scheduling carriers, all resources on the data carrier. One scheduling carrier may schedule one or more data carriers to transmit the sidelink data. For example, the UE may schedule a plurality of carriers on one carrier to transmit the sidelink data, that is, a quantity of the scheduling carrier is one, and a quantity of the data carrier is more than one.

It should be emphasized that a scheduling carrier carrying the scheduling information is different from a part of or all of the data carriers, that is, in a case that transmission of the sidelink data is scheduled in an inter-carrier scheduling manner, the data transmission method provided in this embodiment of the present disclosure may include only step 201 but not include step 202. In other words, the UE may schedule transmission of the sidelink data in an inter-carrier scheduling manner without transmitting feedback data.

Optionally, a carrier carrying the first scheduling information is the same as or different from a carrier carrying the second scheduling information. The following embodiments of the present disclosure are described by using an example in which the carrier carrying the first scheduling information is the same as the carrier carrying the second scheduling information.

Optionally, the first scheduling information may be pre-configured, specified in a protocol, received from a control node, or configured based on a negotiation between UEs.

Optionally, the second scheduling information may be received from a control node, or configured based on a negotiation between UEs.

Optionally, before step 201, the data transmission method provided in this embodiment of the present disclosure may further include step 203:

Step 203: The UE receives the scheduling information from a control node.

Accordingly, the control node (for example, a network device) may send the scheduling information to the UE, where the scheduling information is used to schedule a data carrier in a carrier aggregation scenario to transmit sidelink data, and/or the scheduling information is further used to schedule a feedback carrier to transmit feedback data.

Optionally, in this embodiment of the present disclosure, the foregoing scheduling information includes at least one of first scheduling information or second scheduling information. The first scheduling information is used to schedule the data carrier, and the second scheduling information is used to schedule the feedback carrier.

Optionally, the second scheduling information includes at least one of: a) the first carrier indication information, b) sidelink assignment index information, c) carrier total quantity information, d) carrier occupation information, e) indication information used to indicate a feedback channel carrying feedback data, or f) information about offset between the feedback channel and a reference channel a) The first carrier indication information is used to indicate the data carrier. For example, the first carrier indication information may be used to indicate carrier indicator information (CIF) of the data carrier.

b) The sidelink assignment index information is used to indicate an index of each of at least one scheduling parameter; and one scheduling parameter is used to schedule sidelink data on a part of or all of the data carriers. The sidelink assignment index information may be information about a sidelink assignment index (SAI).

One scheduling parameter may be sidelink control information (SCI). First, the foregoing SAI information is used to indicate an order of SCI scheduling, that is, an index of each SCI. Second, if the UE performs CA scheduling (that is, a plurality of carriers schedule the SCI), all SCI scheduling indexes are indicated in the SCI in order. For example, indexes of SCI of three carriers (CC3, CC2, and CC1) that are scheduled by the UE during CA may be 0, 1, and 2 respectively. For another example, if the UE schedules only one carrier for data transmission, a pre-defined index or a first index (for example, 0) during CA is used. In addition, the UE may learn, based on a received SCI index, whether transmit-end UE enables CA for sending, a quantity of carriers that are used for sending, and/or a specific feedback channel used for sending information such as feedback data (for example, a HARQ feedback) of sidelink data scheduled by the SCI.

Optionally, the feedback channel may be a physical sidelink feedback channel (PSFCH) or a physical sidelink shared channel (PSSCH).

It should be noted that, in this embodiment of the present disclosure, feedback information may be carried in a feedback channel in the feedback carrier. For details about a relationship between the feedback data and the feedback channel, refer to the following embodiments.

c) The carrier total quantity information is used to indicate a carrier quantity of the data carrier.

d) The carrier occupation information is used to indicate whether data is transmitted on each data carrier. The carrier occupation information is used to indicate data carriers that are actually used by the UE to transmit the sidelink data. For example, for a scenario in which four data carriers are configured, a 4-bit bitmap is used to indicate the carrier occupation information. Each bit of the bitmap indicates whether data is actually transmitted on a corresponding data carrier.

It should be understood that information in a) to d) in the second scheduling information may be used to schedule, on the data carrier, transmission of the sidelink data.

e) The indication information used to indicate a feedback channel carrying feedback data is used to indicate resource information of the feedback channel (for example, a PSFCH). For example, the indication information may be a carrier or bandwidth part (BWP), a resource identifier, a quantity of bits for carrying resources, a PSFCH format, a PSFCH frequency hopping pattern, a time-frequency location, a sequence of quantities of resources occupied by a time domain and a frequency domain, a spreading code, or a cyclic shift.

f) The foregoing offset information is used to indicate information about offset of a PSFCH used by SCI scheduled data relative to a reference PSFCH, and is used to determine, based on resource configuration of the reference PSFCH and the offset information, a PSFCH resource used in feedback.

It should be understood that information in e) and f) in the second scheduling information may be used to schedule, on the feedback carrier, transmission of the feedback data.

For sidelink data transmitted by each data carrier (for example, CC1), the feedback carrier (for example, CC1) has one PSFCH used for transmitting a HARQ feedback. For example, in slot n, in a case that a PSFCH channel associated with sidelink data transmission on CC1 is P1, a PSFCH channel associated with data transmission on CCX is PX. In other words, the PSFCH channel P1 is used to transmit feedback data transmitted in sidelink data on CC1, and the PSFCH channel PX is used to transmit feedback data transmitted in sidelink data on CCX.

For example, PX may be obtained via calculation based on P1. For example, from the perspective of frequency domains, in a case that a frequency domain location of P1 is PRB1, a frequency domain location of PX is PRB1+offset_x, where offset_x is a constant, or is obtained based on a carrier number of CCX or one or more pieces of information (for example, sidelink assignment index information, or offset information of a PSFCH) in the scheduling information. Alternatively, PX may be directly obtained based on one or more pieces of information (for example, indication information of a feedback channel, or offset information of a PSFCH) in the scheduling information.

It should be noted that, for CA transmission without HARQ feedbacks (for example, broadcast, or multicast or unicast with a HARQ feedback function disabled), that is, in a scenario in which no feedback carrier transmits feedback data, transmit-end UE may indicate, in the second scheduling information, that sidelink data transmission is CA transmission. For example, the sidelink transmission may be determined as CA transmission based on carrier total quantity information, carrier occupation information, assignment index information, or the like. In this case, receive-end UE may learn, based on the second scheduling information, whether the sidelink data transmission uses CA, and determine whether packet loss occurs, that is, determine whether the sidelink data transmission succeeds.

Optionally, the scheduling carrier may include at least one of: a primary component carrier of the UE, a carrier used to perform radio link monitoring (RLM), a carrier used to transmit sidelink radio resource control (RRC) signaling, a carrier associated with a preset quality of service (QoS), a carrier used to transmit a synchronizing signal, a carrier used to transmit a discovery signal or channel, or a carrier used for radio resource management (RRM).

Optionally, the feedback carrier may include at least one of: a primary component carrier of the UE, a carrier used to perform RLM, a carrier used to transmit sidelink RRC signaling, a carrier associated with a preset QoS, a carrier used to transmit a synchronizing signal, a carrier used to transmit a discovery signal or channel, or a carrier used for RRM.

In this case, because both the scheduling carrier and the feedback carrier may be various different carriers, convenience is brought for UE to select different scheduling carriers and feedback carriers for different services during sidelink transmission, which improves flexibility of the sidelink transmission.

Optionally, a scheduling carrier carrying the scheduling information is the same as the feedback carrier, or the scheduling carrier is different from a part of or all of the feedback carriers.

In a case that the scheduling carrier is the same as the feedback carrier, transmit-end UE sends scheduling information on the feedback carrier, and receives/demodulates feedback data (a HARQ feedback) sent by receive-end UE. The receive-end UE monitors and demodulates the scheduling information on the feedback carrier, and sends the feedback data.

Optionally, in this embodiment of the present disclosure, one feedback carrier is used to bear at least one feedback channel; one feedback channel is used to carry at least one piece of feedback data; and one piece of feedback data is used to indicate a transmission result of sidelink data on one data carrier.

It should be understood that a feedback transmitted on the feedback carrier may correspond to feedback data (for example, a HARQ feedback) transmitted in sidelink data on all data carriers, that is, feedback data on the feedback carrier may correspond to feedback data transmitted in sidelink data on all data carriers.

For example, assuming that the data carrier includes CC1 and CC2, the feedback carrier is CC1. Sidelink data is transmitted on CC1 and CC2. Two HARQ feedbacks on the feedback carrier CC1 respectively indicate whether sidelink data on CC1 is received successfully and whether sidelink data on CC2 is received successfully.

Optionally, UE may indicate feedback data of sidelink data on a data carrier by using one feedback bit (namely, one bit). In this case, each feedback bit may carry one or more feedback channels (for example, PSFCHs).

For example, feedback data on the feedback carrier may be transmitted in the following manners:

a) All HARQ feedback bits are carried in one PSFCH. UE may carry a feedback bit by using a HARQ codebook and/or a HARQ bundling. For example, a quantity of the feedback carrier is 1; and a quantity of the feedback bit of the feedback channel is 1.

b) All HARQ feedback bits are carried in a plurality of PSFCHs. Each PSFCH carries a HARQ feedback bit of sidelink data corresponding to one data carrier. For example, a quantity of the data carrier is more than one. One feedback carrier carries a plurality of feedback channels. Each feedback channel carries one HARQ feedback bit. For example, one feedback carrier is used to send feedback data of sidelink data transmitted on one data carrier.

It should be understood that, in a case that UE configures or activates a plurality of feedback carriers, a HARQ feedback is transmitted on all feedback carriers, that is, each HARQ feedback transmitted in sidelink data on each data carrier is transmitted on all feedback carriers. In addition, receive-end UE may send a HARQ feedback on all feedback carriers or some of the feedback carriers. In addition, transmit-end UE needs to detect feedback channels on all feedback carriers. When detecting that a PSFCH on any feedback carrier receives NACK, the transmit-end UE considers that transmission of sidelink data on a data carrier corresponding to the PSFCH fails. Correspondingly, when detecting that a PSFCH on any feedback carrier receives ACK, the transmit-end UE considers that transmission of sidelink data on a data carrier corresponding to the PSFCH succeeds.

Optionally, before step 201, the data transmission method provided in this embodiment of the present disclosure may further include step 204:

Step 204: The UE obtains configuration information.

The configuration information is used to configure at least one of: the feedback carrier, the data carrier, or a scheduling carrier carrying scheduling information.

Optionally, the configuration information is used to configure a plurality of data carriers for the UE. Actually, data carriers for transmitting sidelink data are a part of or all of the plurality of carriers. In this case, the configuration information may be used to instruct the UE to perform CA sidelink data transmission.

For example, step 204 may be implemented by using step 204*a*.

Step 204*a*: The UE receives the configuration information from the control node.

Optionally, the configuration information may be pre-configured, specified in a protocol, received from a control node, or configured based on a negotiation between UEs.

Accordingly, the control node may send the configuration information to the UE.

It should be understood that, control node-side configuration information may be specified in a protocol or pre-configured.

Optionally, the first scheduling information is used to indicate at least one of: second scheduling information, a resource location of the second scheduling information, a resource location of the sidelink data, first carrier indication information, second carrier indication information, third carrier indication information, a subcarrier spacing (SCS) of the data carrier, an SCS of the feedback carrier, an SCS of a scheduling carrier, an extensible parameter set (such as numerology) of the data carrier, an extensible parameter set of the feedback carrier, or an extensible parameter set of the scheduling carrier. The second scheduling information is used to schedule the data carrier. The first carrier indication information is used to indicate the data carrier. The second carrier indication information is used to indicate the feedback carrier. The third carrier indication information is used to indicate the scheduling carrier.

Optionally, in this embodiment of the present disclosure, the first scheduling information may be used to indicate one or more pieces of information in the second scheduling information. For example, the first scheduling information may be used to indicate sidelink assignment index information in the second scheduling information.

For example, a resource location of the second scheduling information may include time-domain, frequency-domain, or spatial-domain information, or the like, such as slot index, sub-slot index, symbol index, PRB (Physical RB) index, or sub-channel index.

Similarly, a resource location of sidelink data may include time-domain, frequency-domain, or spatial-domain information, or other information of the sidelink data, such as slot index, sub-slot index, symbol index, PRB index, or sub-channel index.

In addition, the first carrier indication information of the data carrier may include a frequency number, a carrier indicator, a carrier ID, or the like of the data carrier. Similarly, the second carrier indication information of the feedback carrier may include a frequency number, a carrier indicator, a carrier ID, or the like of the feedback carrier. In addition, the third carrier indication information of the scheduling carrier may include a frequency number, a carrier indicator, a carrier ID, or the like of the scheduling carrier.

Optionally, in this embodiment of the present disclosure, the UE may transmit sidelink data on the data carrier in a preset communications manner, and transmit feedback data on the feedback carrier.

The foregoing preset communications manner includes at least one of unicast, multicast, or broadcast.

Optionally, the preset communications manner may be configured by the control node for UE, controlled by UE based on service requirements, or directly configured based on a negotiation between UEs.

For example, in a scenario that UE transmits sidelink data via multicast, receive-end UE of sidelink data sends feedback data to the UE via multicast.

For example, the data transmission method provided in this embodiment of the present disclosure may be applied to a plurality of scenarios, for example, scenario 1 and scenario 2. In scenario 1, CA sidelink data may be transmitted between UE. In scenario 2, feedback data of the sidelink data may be transmitted between the UE.

Figure 3:
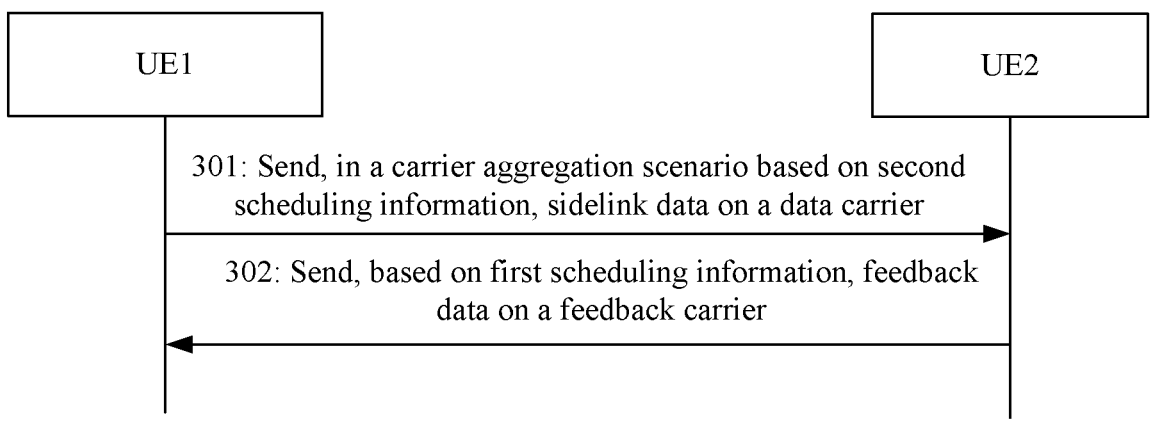
FIG. 3 is a second schematic flowchart of a data transmission method according to an embodiment of the present disclosure.

In example 1, as shown in FIG. 3, it is assumed that in scenario 1, UE1 is transmit-end UE, and UE2 is receive-end UE. Step 201 may be implemented by using step 301.

Step 301: UE1 sends, in a carrier aggregation scenario based on the second scheduling information, sidelink data on a data carrier to UE2.

Accordingly, UE2 may receive, in the carrier aggregation scenario based on the second scheduling information, sidelink data on the data carrier from UE1.

It should be understood that, UE2 may monitor on the data carrier and receive the sidelink data from UE1 based on indication of the second scheduling information.

Optionally, before performing step 301, UE1 may further send the second scheduling information to UE2.

For example, in example 1, in scenario 2, as shown in FIG. 3, step 202 may be implemented by using step 302.

Step 302: UE2 sends, based on the first scheduling information, feedback data on the feedback carrier to UE1.

Accordingly, UE1 may receive, based on the first scheduling information, feedback data on the feedback carrier from UE2.

Optionally, in a scenario that UE1 and UE2 use a unicast communication mode, a feedback mode of the feedback data may be an ACK/NACK mode. For example, when receiving sidelink data from UE1 on a data carrier successfully, UE2 sends ACK corresponding to the sidelink data on the data carrier to UE1. When failing to receive the sidelink data from UE1 on the data carrier, UE2 sends NACK corresponding to the sidelink data on the data carrier to UE1.

In example 2, UE uses multicast. The multicast may be connection-based multicast or connectionless multicast. It is assumed that in a multicast scenario in scenario 1, UE1 is transmit-end UE, while UE2, UE3 and UE4 are receive-end UE, that is, UE1, UE2, UE3, and UE4 are member UE of the same multicast.

Step 201 may be implemented by using step 401.

Step 401: UE1 sends, in a carrier aggregation scenario based on the second scheduling information, sidelink data on a data carrier to member UE.

Accordingly, UE2, UE3, and UE4 may receive the sidelink data from UE1 on the data carrier based on the second scheduling information.

It should be understood that, UE2, UE3, and UE4 may monitor on the data carrier and receive the sidelink data from UE1 on the data carrier based on indication of the second scheduling information.

Optionally, before performing step 401, UE1 may further send the foregoing scheduling information to UE2, UE3, and UE4 via multicast.

For example, in example 2, in scenario 2, step 202 may be implemented by using step 402.

Step 402: UE2 sends, based on the second scheduling information for element UE, the feedback data on the feedback carrier to UE1.

Accordingly, UE1 may receive, based on the second scheduling information, feedback data on the feedback carrier from UE2.

Optionally, in a scenario that UE1 and UE2 use a unicast communication mode, a feedback mode of the feedback data may be an ACK/NACK mode. For example, when receiving sidelink data from UE1 on a data carrier successfully, UE2 sends ACK corresponding to the sidelink data on the data carrier to UE1. When failing to receive the sidelink data from UE1 on the data carrier, UE2 sends NACK corresponding to the sidelink data on the data carrier to UE1.

Optionally, in a scenario that UE1 and UE2 use a multicast communication mode, a feedback mode of the feedback data may be a NACK-only mode. For example, when receiving sidelink data from UE1 on a data carrier successfully, UE2 sends no data to UE1. When failing to receive the sidelink data from UE1 on the data carrier, UE2 sends NACK corresponding to the sidelink data on the data carrier to UE1.

Similarly, for a step in which UE3 and UE4 feed back data to UE1, refer to related description in step 402.

In implementation 1, UE1, UE2, and UE3 configure a plurality of carriers (for example, CC1 and CC2) to perform sidelink communication, UE4 configures only a single carrier (for example, CC1) to perform sidelink communication. CC1 is used as a feedback carrier and a scheduling carrier. PSFCH1 on CC1 is used for HARQ feedback of CC1. PSFCH2 is used for HARQ feedback of CC2.

UE1 configures CA for NACK-only multicast transmission, and sends a scheduling parameter (for example, SCI) on CC1 to respectively schedule sidelink data to be sent on CC1 and CC2.

Figure 4:
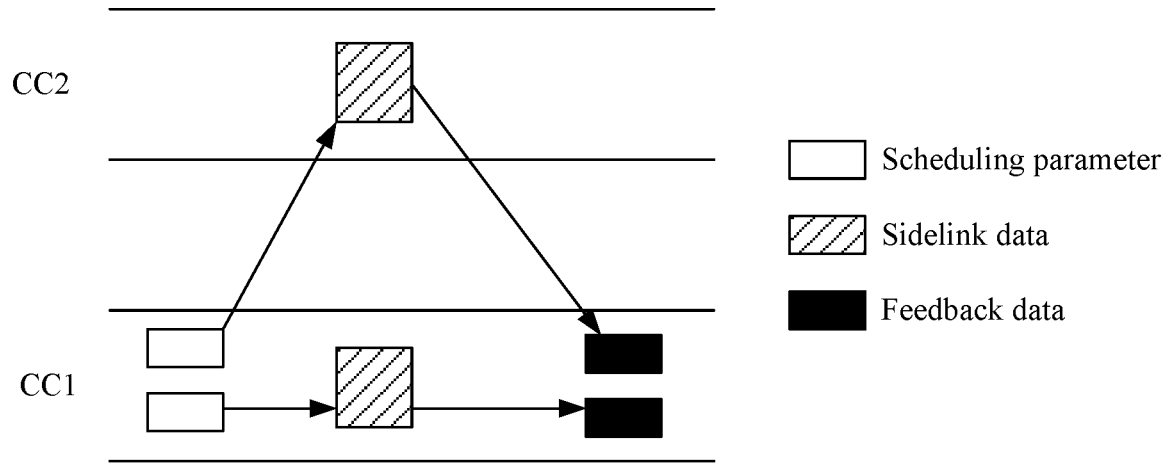
FIG. 4 is a first schematic diagram of a data transmission carrier according to an embodiment of the present disclosure.

For example, as shown in FIG. 4, the second scheduling information may include a plurality of pieces of SCI, so that UE may use the plurality of pieces of SCI to respectively schedule the sidelink data to be sent on a plurality of CCs. For example, UE may use two pieces of SCI to respectively schedule sidelink data to be sent on CC1 and CC2.

Optionally, the second scheduling information includes a plurality of pieces of SCI. The pieces of SCI respectively use different carrier indication information which respectively indicate different CCs. For example, SCI1 and SCI1 are respectively used to schedule CC1 and CC2.

Optionally, the second scheduling information includes one piece of SCI. The SCI indicates a plurality of different CCs. The SCI is used to schedule sidelink data to be sent on a plurality of CCs (for example, CC1 and CC2). UE may indicate, via carrier occupation information of SCI, a quantity of CCs to which data transmission (namely, sidelink data transmission) is allocated. UE may join up frequency-domain resources of all CCs for numbering, to simulate one CC or BWP for resource allocation and the like.

UE2 and UE3 may monitor CC1, obtain and demodulate SCI in scheduling information, and receive, on CC1 and CC2 based on indication information in SCI, sidelink data transmitted in a multicast manner. In a case that UE2 and UE3 successfully receive the sidelink data on CC1 and CC2, because a HARQ feedback is a multicast NACK-only feedback, UE2 and UE3 send no feedback.

In addition, because UE4 configures only a single-carrier sidelink, UE4 performs monitoring on only CC1. For example, when obtaining SCI in scheduling information sent by UE1, and learning that CC2 still has multicast data to be sent, UE4 learns that UE4 loses data transmitted on CC2. In this case, UE4 may send a NACK feedback on PSFCH2 of CC1. In this way, when receiving the NACK feedback on PSFCH2, UE1 can learn that at least one piece of member UE fails to receive sidelink data.

It should be noted that, according to the data transmission method provided in this embodiment of the present disclosure, transmit-end UE and receive-end UE can exchange scheduling information, so that the transmit-end UE and the receive-end UE both can learn a specific carrier on which sidelink data is transmitted and a specific carrier on which feedback data is transmitted. Therefore, the transmit-end UE and the receive-end UE can have consistent understandings of sidelink transmission, which can resolve a problem that NACK-only broadcast fails because a carrier monitored by the transmit-end UE does not match a carrier monitored by the receive-end UE. In addition, because UE needs to perform only resource sensing, reservation, and allocation on a scheduling carrier, UE does not need to allocate PSCCH channels on other carriers. Similarly, because UE needs to transmit a HARQ feedback on only the feedback carrier, UE does not need to allocate PSFCH channels on other carriers. This can reduce system overheads, and improve spectrum efficiency and data throughput. In addition, because a PSFCH exists on only a feedback carrier, a problem that UE needs to not only transmit a PSSCH (a PSSCH carrying scheduling information) on a CC, but also receive a feedback of a PSFCH (a PSFCH carrying feedback data) on another CC can be resolved, that is, a problem of half-duplex caused by a sending and receiving conflict can be resolved.

Optionally, sidelink assignment index information may indicate indexes of N pieces of SCI (scheduling parameter). N is a positive integer.

Optionally, the indexes of the N pieces of SCI are ranked in a first order, and are in a one-to-one correspondence with N data carriers that correspond to the N pieces of SCI and that are ranked in a second order. Optionally, the first order and the second order are reverse to each other.

Optionally, in a case that the second scheduling information includes sidelink assignment index information, and the sidelink assignment index information is used to indicate the indexes of the N pieces of SCI, if a channel quantity of the feedback channel is N, the indexes that are of the N pieces of SCI and that are ranked in the first order are in a one-to-one correspondence with feedback channels that correspond to the N pieces of SCI and that are ranked in a third order. The first order and the third order are the same as each other.

Figure 5:
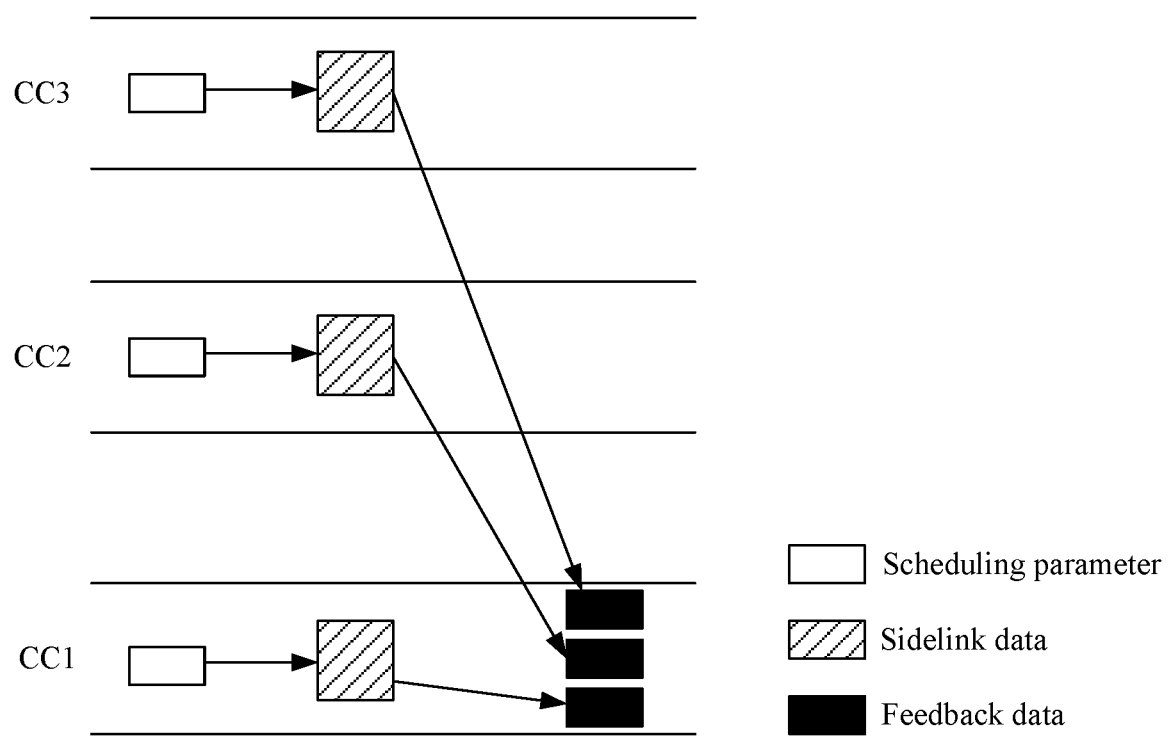
FIG. 5 is a second schematic diagram of a data transmission carrier according to an embodiment of the present disclosure.

For example, in implementation 2, as shown in FIG. 5, UE configures a plurality of data carriers to transmit sidelink data, and transmits a scheduling parameter (for example, SCI) on each data carrier, thereby scheduling sidelink data transmission on each data carrier. In addition, the UE transmits, on one feedback carrier, feedback data of sidelink data on all data carriers.

For example, UE configures a plurality of carriers (CC1, CC2, and CC3) to perform sidelink communication. Each carrier performs self-scheduling independently. However, CC1 is used as a feedback carrier; and PSFCH1, PSFCH2, and PSFCH3 on CC1 are respectively configured to transmit HARQ feedbacks of CC1, CC2, and CC3.

Optionally, a specific feedback carrier that is used to transmit feedback data and a specific CC whose of sidelink data corresponds to the feedback data depend on sidelink assignment index information (for example, an index of SCI) in scheduling information. In this case, the data carrier includes CC1, CC2, and CC3.

UE1 configures CA for NACK-only multicast transmission, and sends SCI1, SCI2, and SCI3 on CC1, CC2, and CC3 respectively, to schedule sidelink data blocks to be sent on CC1, CC2, and CC3.

The scheduling information includes the sidelink assignment index information, namely, the indexes of SCI. For example, an index of SCI1 that schedules CC1 is 3, an index of SCI2 that schedules CC2 is 2, and an index of SCI3 that schedules CC3 is 1. In this case, feedback data of sidelink data scheduled on CC1 is transmitted by using PSFCH3; feedback data of sidelink data scheduled on CC2 is transmitted by using PSFCH2; and feedback data of sidelink data scheduled on CC3 is transmitted by using PSFCH1.

Obviously, an order of CC1, CC2, and CC3 is reverse to an order of the indexes of SCI1, SCI2, and SCI3. The order of the indexes of SCI1, SCI2, and SCI3 is the same as an order of PSFCH3, PSFCH2, and PSFCH1.

For example, UE2 may monitor CC1, CC2, and CC3, to obtain and demodulate SCI in scheduling information, and receive, on CC1, CC2, and CC3 based on indication of SCI, sidelink data transmitted in a multicast manner. In a case that UE2 successfully receives the sidelink data on CC1, CC2, and CC3, because a HARQ feedback is a multicast NACK-only feedback, UE2 sends no feedback.

In a case that UE3 monitors only CC1, UE3 may obtain and demodulate SCI1 in the scheduling information, and find that an index of SCI1 is 3, thereby learning that two pieces of data are lost, that is, sidelink data transmitted on CC2 and sidelink data transmitted on CC3 are lost. In this case, UE3 sends NACK feedbacks on PSFCH2 and PSFCH3 of CC1 respectively.

In a case that UE4 monitors only CC1 and CC3, UE3 may obtain and demodulate SCI1 and SCI3, and find that indexes of SCI1 and SCI3 are 3 and 1 respectively, thereby learning that one piece of data is lost, that is, sidelink data transmitted on CC2 is lost. In this case, UE4 sends a NACK feedback on PSFCH2 of CC1.

For example, UE1 can learn, by monitoring PSFCHs on CC1, that there is a group element failing to receive sidelink data on CC2 and CC3.

It should be noted that, according to the data transmission method provided in this embodiment of the present disclosure, UE needs to monitor at least the feedback carrier to receive and send a HARQ feedback (namely, feedback data), so that an index of SCI on the feedback carrier may be the last index of a plurality of pieces of SCI, thereby ensuring that the UE monitoring the feedback carrier can find all lost packets.

In addition, because UE needs to transmit a HARQ feedback on only the feedback carrier, UE does not need to allocate PSFCH channels on other carriers. This can reduce system overheads, such as overheads of a PSCCH or a PSFCH and corresponding AGC and GP symbols.

In addition, UE can independently perform resource sensing, resource reservation, and other operations on each carrier, can perform or optimize resource allocation with reference to channel measurement results of all carriers, and can prevent SCI of all carriers from concentrating on one carrier. Therefore, overload of a control channel (for example, a PSCCH) can be avoided.

Optionally, in a case that the scheduling carrier is all carriers in the data carrier, each data carrier is used to carry feedback data.

Figure 6:
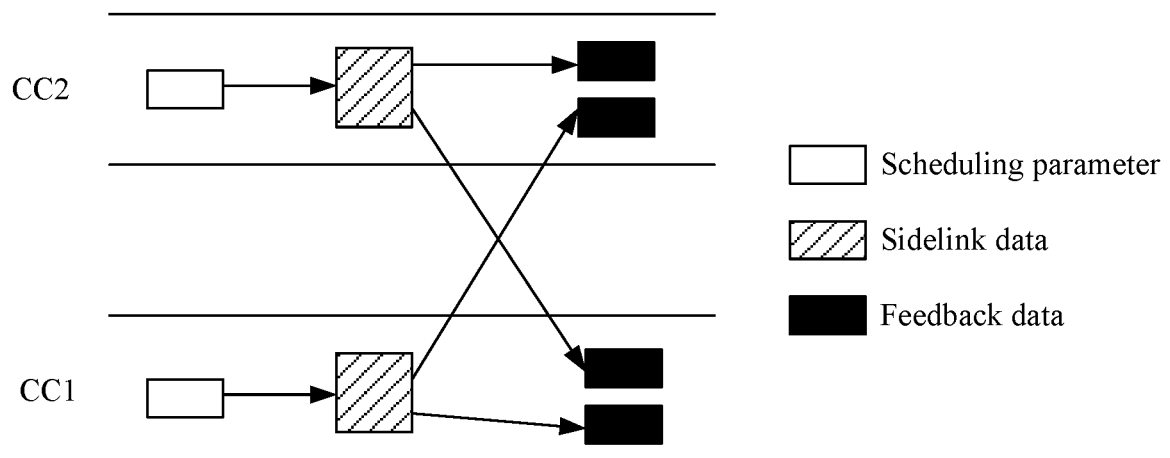
FIG. 6 is a third schematic diagram of a data transmission carrier according to an embodiment of the present disclosure.

For example, in implementation 3, as shown in FIG. 6, UE configures a plurality of data carriers to transmit sidelink data, and transmits a scheduling parameter (for example, SCI) on each data carrier, thereby scheduling sidelink data transmission on each data carrier. In addition, the UE transmits, on each data carrier, feedback data of sidelink data on all data carriers, that is, each data carrier may be a scheduling carrier and a feedback carrier.

For example, referring to FIG. 6, UE1, UE2, and UE3 configure a plurality of carriers (for example, CC1 and CC2) to perform sidelink communication. Each carrier performs self-scheduling independently. Each carrier is used as a feedback carrier. PSFCH1 and PSFCH2 on CC1 are used to respectively transmit HARQ feedbacks of CC1 and CC2. PSFCH3 and PSFCH4 on CC2 are used to transmit HARQ feedbacks of CC1 and CC2.

UE1 configures CA for NACK-only multicast transmission, and sends SCI1 and SCI2 on CC1 and CC2 respectively, to respectively schedule sidelink data blocks to be sent on CC1 and CC2.

In a case that UE2 monitors CC1 and CC2, UE2 can obtain and demodulate SCI in the scheduling information, and successfully receive, on CC1 and CC2 based on indication of the SCI, sidelink data transmitted in a multicast communication manner. In a case that UE2 successfully receives the sidelink data on CC1 and CC2, because a HARQ feedback is a multicast NACK-only feedback, UE2 sends no feedback.

In a case that UE2 sends feedback data in an ACK/NACK feedback mode, UE2 may send an ACK feedback on all PSFCHs (namely, PSFCH1, PSFCH2, PSFCH3, and PSFCH4) on CC1 and CC2 to, or send feedback data on a PSFCH of either of CC1 and CC2.

In a case that UE3 monitors only CC1, UE3 may obtain and demodulate SCI1 in the scheduling information, and find that sidelink data transmitted on CC2 is lost. UE3 obtains, based on one or more of indication information of SCI1, carrier indication information, and time-frequency resource information of data, a PSFCH resource (namely, PSFCH2) that is on CC1 and that is associated with CC2, and sends a NACK feedback on PSFCH2 of CC1.

In a case that UE4 monitors only CC2, UE4 may obtain and demodulate SCI2 in the scheduling information, and find that sidelink data transmitted on CC1 is lost. UE4 obtains, based on one or more of indication information of SCI2, carrier indication information, and time-frequency resource information of data, a PSFCH resource (namely, PSFCH3) that is on CC2 and that is associated with CC1, and sends a NACK feedback on PSFCH3 of CC2.

Further, UE1 can monitor PSFCHs on CC1 and CC2, and learn, based on whether the NACK feedback is received, whether there is a group member failing to receive sidelink data.

In this way, because not all receive-end UE are required to use the same feedback carrier, and each receive-end UE is allowed to independently select a carrier for monitoring, it is beneficial to increase the probability of successful reception in sidelink data transmission and improve the accuracy of feedback data of sidelink data transmission.

It should be noted that, scheduling information can be obtained according to the data transmission method provided in this embodiment of the present disclosure. The scheduling information is used to instruct UE to perform sidelink data transmission in a carrier aggregation scenario, and instruct the UE to perform feedback data transmission in the carrier aggregation scenario. In this way, after scheduling information is exchanged between transmit-end UE and receive-end UE, the transmit-end UE and the receive-end UE can learn a specific carrier on which sidelink data is transmitted and a specific carrier on which feedback data is transmitted. Therefore, the transmit-end UE and the receive-end UE can have consistent understandings of sidelink transmission, which can resolve a problem that NACK-only broadcast fails because a carrier monitored by the transmit-end UE does not match a carrier monitored by the receive-end UE. In addition, unicast, multicast, or broadcast CA transmission on a sidelink can be implemented to meet corresponding service requirements. Moreover, because a plurality of carriers can be scheduled by using one carrier to transmit sidelink data, and feedback data of sidelink data on all carriers can be transmitted by using one carrier, overheads on a control channel (for example, a PSCCH or a PSFCH) can be reduced, thereby improving spectrum efficiency and data throughput, and resolving a problem of half-duplex caused when a plurality of carriers receive and send different physical channels at the same time.

Figure 7:
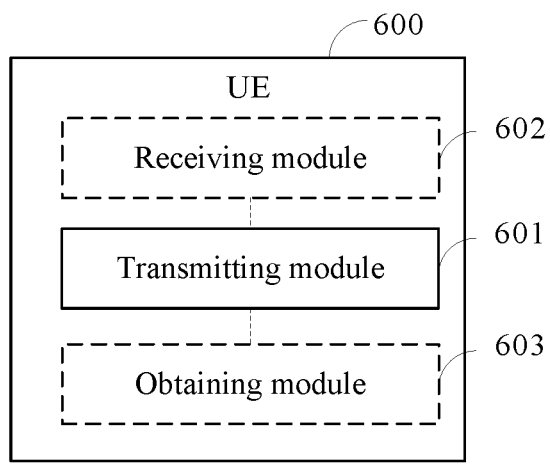
FIG. 7 is a first schematic structural diagram of UE according to an embodiment of the present disclosure.

FIG. 7 is a possible schematic structural diagram of UE according to an embodiment of the present disclosure. As shown in FIG. 7, the UE 600 includes a transmitting module 601. The transmitting module 601 is configured to: transmit, in a carrier aggregation scenario based on scheduling information, sidelink data on a data carrier and feedback data on a feedback carrier, where the scheduling information is used to schedule the data carrier and/or the feedback carrier, and the feedback data is used to indicate a transmission result of the sidelink data.

Optionally, a scheduling carrier carrying the scheduling information is different from a part of or all of the data carriers, or the scheduling carrier is the same as the data carrier.

Optionally, a scheduling carrier carrying the scheduling information is the same as the feedback carrier, or the scheduling carrier is different from a part of or all of the feedback carriers.

Optionally, one feedback carrier is used to bear at least one feedback channel; one feedback channel is used to carry at least one piece of feedback data; and one piece of feedback data is used to indicate a transmission result of sidelink data on one data carrier.

Optionally, the UE further includes a receiving module 602. The receiving module 602 is configured to: receive the scheduling information from a control node before the transmitting module 601 transmits, based on the scheduling information, the sidelink data on the data carrier and the feedback data on the feedback carrier; or receive the scheduling information from a control node before the transmitting module 601 transmits the feedback data on the feedback carrier based on the scheduling information.

Optionally, the UE further includes an obtaining module 603. The obtaining module 603 is configured to: obtain configuration information before the transmitting module 601 transmits, based on the scheduling information, the sidelink data on the data carrier and the feedback data on the feedback carrier, where the configuration information is used to configure at least one of: the feedback carrier, the data carrier, or a scheduling carrier carrying scheduling information.

Optionally, the configuration information is pre-configured, specified in a protocol, received from a control node, or configured based on a negotiation between UEs.

Optionally, the scheduling information includes first scheduling information. The scheduling information is used to schedule the feedback carrier. The first scheduling information is used to indicate at least one of: second scheduling information, a resource location of the second scheduling information, a resource location of the sidelink data, first carrier indication information, second carrier indication information, third carrier indication information, a subcarrier spacing SCS of a sidelink data carrier, an SCS of the feedback carrier, an SCS of a scheduling carrier carrying the first scheduling information, an extensible parameter set of the data carrier, an extensible parameter set of the feedback carrier, or an extensible parameter set of the scheduling carrier. The second scheduling information is used to schedule the data carrier. The first carrier indication information is used to indicate the data carrier. The second carrier indication information is used to indicate the feedback carrier. The third carrier indication information is used to indicate the scheduling carrier. The second scheduling information is used to schedule the data carrier.

Optionally, the scheduling information includes the second scheduling information. The second scheduling information is used to schedule the data carrier. The second scheduling information includes at least one of: the first carrier indication information, sidelink assignment index information, carrier total quantity information, carrier occupation information, indication information used to indicate a feedback channel carrying the feedback data, or information about offset between the feedback channel and a reference channel. The first carrier indication information is used to indicate the data carrier. The sidelink assignment index information is used to indicate an index of each of at least one scheduling parameter. One scheduling parameter is used to schedule sidelink data on a part of or all of the data carriers. The carrier total quantity information is used to indicate a carrier quantity of the data carrier. The carrier occupation information is used to indicate whether data is transmitted on each data carrier.

Optionally, the scheduling carrier includes at least one of: a primary component carrier of the UE, a carrier used to perform radio link monitoring, a carrier used to transmit sidelink radio resource control signaling, a carrier associated with a preset quality of service, a carrier used to transmit a synchronizing signal, a carrier used to transmit a discovery signal or channel, or a carrier used for radio resource management.

Optionally, the feedback carrier includes at least one of: a primary component carrier of the UE, a carrier used to perform radio link monitoring, a carrier used to transmit sidelink radio resource control signaling, a carrier associated with a preset quality of service, a carrier used to transmit a synchronizing signal, a carrier used to transmit a discovery signal or channel, or a carrier used for radio resource management.

The UE provided in this embodiment of the present disclosure can implement related steps in the foregoing method embodiments. To avoid repetition, details are not described herein again.

The UE provided in this embodiment of the present disclosure can obtain scheduling information. The scheduling information is used to instruct the UE to perform sidelink data transmission in a carrier aggregation scenario, and instruct the UE to perform feedback data transmission in the carrier aggregation scenario. In this way, after scheduling information is exchanged between transmit-end UE and receive-end UE, the transmit-end UE and the receive-end UE can learn a specific carrier on which sidelink data is transmitted and a specific carrier on which feedback data is transmitted. Therefore, the transmit-end UE and the receive-end UE can have consistent understandings of sidelink transmission, which can resolve a problem that NACK-only broadcast fails because carriers monitored by the transmit-end UE do not match carriers monitored by the receive-end UE. In addition, unicast, multicast, or broadcast CA transmission on a sidelink can be implemented to meet corresponding service requirements. Moreover, because a plurality of carriers can be scheduled by using one carrier to transmit sidelink data, and feedback data of sidelink data on all carriers can be transmitted by using one carrier, overheads on a control channel (for example, a PSCCH or a PSFCH) can be reduced, thereby improving spectrum efficiency and data throughput, and resolving a problem of half-duplex caused when a plurality of carriers receive and send different physical channels at the same time.

Figure 8:
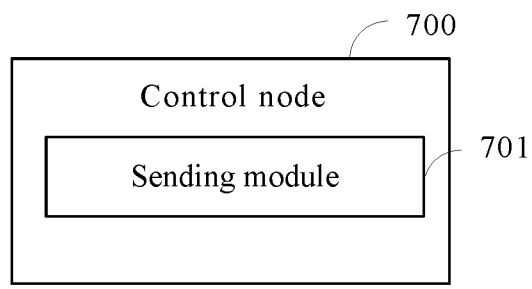
FIG. 8 is a first schematic structural diagram of a control node according to an embodiment of the present disclosure.

FIG. 8 is a possible schematic structural diagram of control node according to an embodiment of the present disclosure. As shown in FIG. 8, the control node 700 includes a sending module 701.

The sending module 701 is configured to send scheduling information to user equipment UE. The scheduling information is used to schedule a data carrier in a carrier aggregation scenario to transmit sidelink data, and/or the scheduling information is used to schedule a feedback carrier to transmit feedback data. The feedback data is used to indicate a transmission result of the sidelink data.

Optionally, the sending module 701 is further configured to send configuration information to the UE before sending the scheduling information to the UE.

The configuration information is used to indicate at least one of: the feedback carrier, the data carrier, or a scheduling carrier carrying scheduling information.

Optionally, a scheduling carrier carrying the scheduling information is different from a part of or all of the data carriers, or the scheduling carrier is the same as the data carrier.

Optionally, a scheduling carrier carrying the scheduling information is the same as the feedback carrier, or the scheduling carrier is different from a part of or all of the feedback carriers.

Optionally, the scheduling information includes first scheduling information. The first scheduling information is used to schedule the feedback carrier. The first scheduling information is used to indicate at least one of: second scheduling information, a resource location of the second scheduling information, a resource location of the sidelink data, first carrier indication information, second carrier indication information, third carrier indication information, a subcarrier spacing SCS of the data carrier, an SCS of the feedback carrier, an SCS of a scheduling carrier carrying the second scheduling information, an extensible parameter set of the data carrier, an extensible parameter set of the feedback carrier, or an extensible parameter set of the scheduling carrier. The second scheduling information is used to schedule the data carrier. The first carrier indication information is used to indicate the data carrier. The second carrier indication information is used to indicate the feedback carrier. The third carrier indication information is used to indicate the scheduling carrier. The second scheduling information is used to schedule the data carrier.

Optionally, the scheduling information includes the second scheduling information. The second scheduling information is used to schedule the data carrier. The second scheduling information includes at least one of: the first carrier indication information, sidelink assignment index information, carrier total quantity information, carrier occupation information, indication information used to indicate a feedback channel carrying the feedback data, or information about offset between the feedback channel and a reference channel. The first carrier indication information is used to indicate the data carrier. The sidelink assignment index information is used to indicate an index of each of at least one scheduling parameter. One scheduling parameter is used to schedule sidelink data on a part of or all of the data carriers. The carrier total quantity information is used to indicate a carrier quantity of the data carrier. The carrier occupation information is used to indicate whether data is transmitted on each data carrier.

Optionally, the scheduling carrier includes at least one of: a primary component carrier of the UE, a carrier used to perform radio link monitoring, a carrier used to transmit sidelink radio resource control RRC signaling, a carrier associated with a preset quality of service, a carrier used to transmit a synchronizing signal, a carrier used to transmit a discovery signal or channel, or a carrier used for radio resource management.

Optionally, the feedback carrier includes at least one of: a primary component carrier of the UE, a carrier used to perform radio link monitoring, a carrier used to transmit sidelink radio resource control signaling, a carrier associated with a preset quality of service, a carrier used to transmit a synchronizing signal, a carrier used to transmit a discovery signal or channel, or a carrier used for radio resource management.

The control node provided in this embodiment of the present disclosure can implement related steps in the foregoing method embodiments. To avoid repetition, details are not described herein again.

The control node provided in this embodiment of the present disclosure can send scheduling information to UE. The scheduling information is used to instruct the UE to perform sidelink data transmission in a carrier aggregation scenario, and instruct the UE to perform feedback data transmission in the carrier aggregation scenario. In this way, after scheduling information is exchanged between transmit-end UE and receive-end UE, the transmit-end UE and the receive-end UE can learn a specific carrier on which sidelink data is transmitted and a specific carrier on which feedback data is transmitted. Therefore, the transmit-end UE and the receive-end UE can have consistent understandings of sidelink transmission, which can resolve a problem that NACK-only broadcast fails because carriers monitored by the transmit-end UE do not match carriers monitored by the receive-end UE. In addition, the control node can configure, for UE, unicast, multicast, or broadcast CA transmission on a sidelink, to meet corresponding service requirements. Moreover, because a plurality of carriers can be scheduled to transmit sidelink data by using one carrier, and feedback data of sidelink data on all carriers can be transmitted by using one carrier, overheads on a control channel (for example, a PSCCH or a PSFCH) can be reduced, thereby improving spectrum efficiency and data throughput, and resolving a problem of half-duplex caused when a plurality of carriers receive and send different physical channels at the same time.

Figure 9:
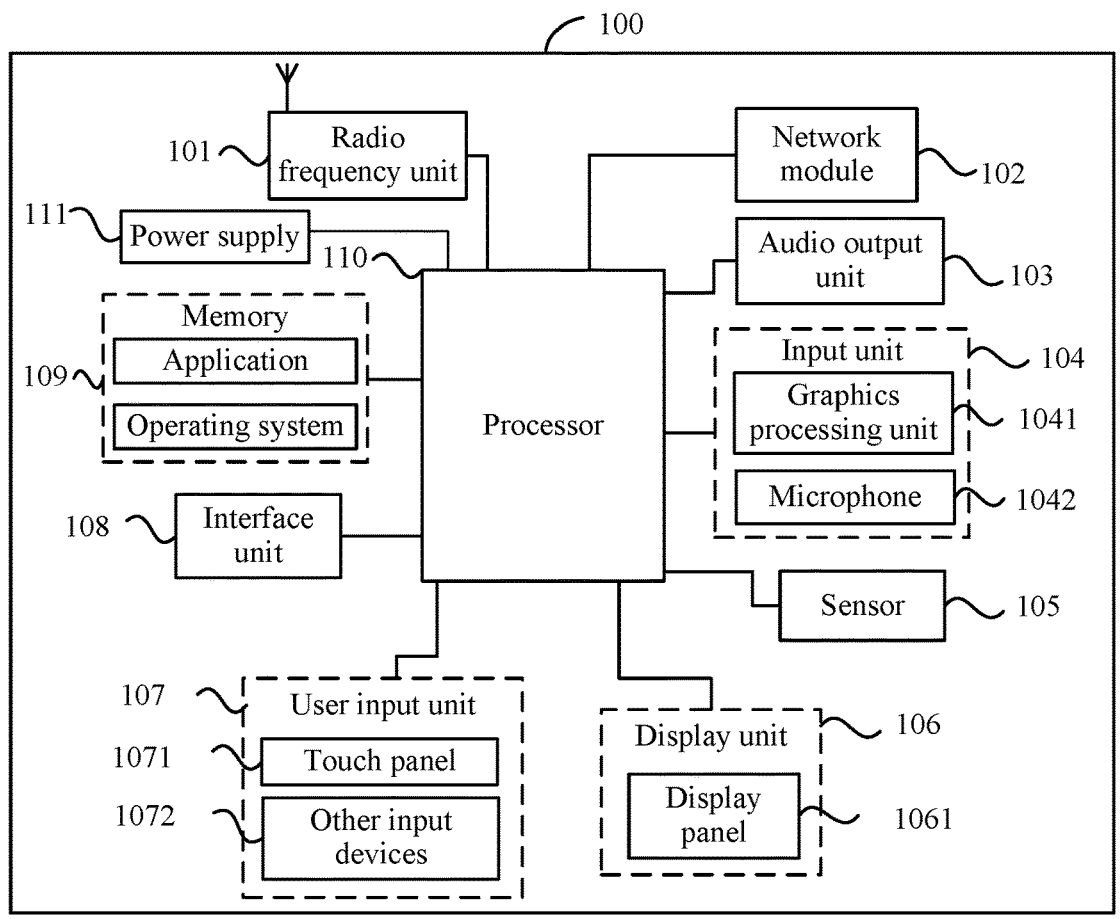
FIG. 9 is a second schematic structural diagram of UE according to an embodiment of the present disclosure.

FIG. 9 is a schematic structural diagram of hardware of UE according to an embodiment of the present disclosure. The UE 100 includes but is not limited to: a radio frequency unit 101, a network module 102, an audio output unit 103, an input unit 104, a sensor 105, a display unit 106, a user input unit 107, an interface unit 108, a memory 109, a processor 110, a power supply 111, and the like. A person skilled in the art may understand that a structure of the UE 100 shown in FIG. 9 does not constitute a limitation on the UE, and the UE 100 may include more or fewer components than those shown in the figure, or some components may be combined, or there may be a different component arrangement. In this embodiment of the present disclosure, the UE 100 includes but is not limited to: a mobile phone, a tablet computer, a notebook computer, a palmtop computer, a vehicle-mounted terminal device, a wearable device, a pedometer, or the like.

The radio frequency unit 101 is configured to: transmit, in a carrier aggregation scenario based on scheduling information, sidelink data on a data carrier, and transmit feedback data on a feedback carrier based on the scheduling information. The scheduling information is used to schedule the data carrier and the feedback carrier. The feedback data is used to indicate a transmission result of the sidelink data.

The UE provided in this embodiment of the present disclosure can obtain scheduling information. The scheduling information is used to instruct the UE to perform sidelink data transmission in a carrier aggregation scenario, and instruct the UE to perform feedback data transmission in the carrier aggregation scenario. In this way, after scheduling information is exchanged between transmit-end UE and receive-end UE, the transmit-end UE and the receive-end UE can learn a specific carrier on which sidelink data is transmitted and a specific carrier on which feedback data is transmitted. Therefore, the transmit-end UE and the receive-end UE can have consistent understandings of sidelink transmission, which can resolve a problem that NACK-only broadcast fails because carriers monitored by the transmit-end UE do not match carriers monitored by the receive-end UE. In addition, unicast, multicast, or broadcast CA transmission on a sidelink can be implemented to meet corresponding service requirements. Moreover, because a plurality of carriers can be scheduled by using one carrier to transmit sidelink data, and feedback data of sidelink data on all carriers can be transmitted by using one carrier, overheads on a control channel (for example, a PSCCH or a PSFCH) can be reduced, thereby improving spectrum efficiency and data throughput, and resolving a problem of half-duplex caused when a plurality of carriers receive and send different physical channels at the same time.

It should be understood that in this embodiment of the present disclosure, the radio frequency unit 101 may be configured to receive and send information, or receive and send signals during a call. For example, after receiving downlink data from a base station, the radio frequency unit sends the downlink data to the processor 110 for processing. In addition, the radio frequency unit sends uplink data to the base station. Generally, the radio frequency unit 101 includes but is not limited to: an antenna, at least one amplifier, a transceiver, a coupler, a low noise amplifier, and a duplexer, and the like. In addition, the radio frequency unit 101 may further communicate with another communications device through a wireless communication system and network.

The UE 100 provides the user with wireless broadband Internet access by using the network module 102, for example, helps the user send or receive an email, browse a web page, access streaming media, and the like.

The audio output unit 103 may convert audio data received by the radio frequency unit 101 or the network module 102 or stored in the memory 109 into an audio signal, and output the audio signal as sound. In addition, the audio output unit 103 may also provide audio output related to a specific function performed by the UE 100 (for example, call signal receiving sound or message receiving sound). The audio output unit 103 includes a speaker, a buzzer, a receiver, and the like.

The input unit 104 is configured to receive audio or video signals. The input unit 104 may include a graphics processing unit (GPU) 1041 and a microphone 1042. The graphics processing unit 1041 is configured to process image data of a static picture or a video obtained by an image capture apparatus (for example, a camera) in video capture mode or image capture mode. A processed image frame may be displayed on the display unit 106. The image frame processed by the graphics processing unit 1041 may be stored in the memory 109 (or another storage medium) or sent via the radio frequency unit 101 or the network module 102. The microphone 1042 may receive sound and can process such sound into audio data. The processed audio data may be output by being converted into a format that may be sent to a mobile communications base station by using the radio frequency unit 101 in a telephone call mode.

The UE 100 further includes at least one sensor 105, for example, a light sensor, a motion sensor, and other sensors. For example, the light sensor includes an ambient light sensor and a proximity sensor, where the ambient light sensor may adjust brightness of a display panel 1061 based on brightness of ambient light, and the proximity sensor may turn off the display panel 1061 and/or backlight when the UE 100 is moved towards the ear. As a motion sensor, an accelerometer sensor may detect magnitude of acceleration in various directions (usually three axes), may detect magnitude and the direction of gravity when stationary, may be configured to identify UE postures (such as horizontal and vertical screen switch, related games, and magnetometer posture calibration), may perform functions related to vibration identification (such as a pedometer and a knock), and the like. The sensor 105 may further include a fingerprint sensor, a pressure sensor, an iris sensor, a molecular sensor, a gyroscope, a barometer, a hygrometer, a thermometer, an infrared sensor, or the like. Details are not described herein.

The display unit 106 is configured to display information inputted by a user or information provided to a user. The display unit 106 may include the display panel 1061, and the display panel 1061 may be configured in a form of a liquid crystal display (LCD), an organic light-emitting diode (OLED), or the like.

The user input unit 107 may be configured to receive input digit or character information and generate key signal input related to user setting and function control of the UE 100. For example, the user input unit 107 includes a touch panel 1071 and another input device 1072. The touch panel 1071, also referred to as a touchscreen, can collect a touch operation performed by a user on or near the touch panel 1071 (such as an operation on or near the touch panel 1071 performed by a user by using any suitable object or accessory such as a finger or a stylus). The touch panel 1071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, sends the point coordinates to the processor 110, and receives and executes a command sent by the processor 110. In addition, the touch panel 1071 may be of a resistive type, a capacitive type, an infrared type, a surface acoustic wave type, or the like. In addition to the touch panel 1071, the user input unit 107 may further include another input device 1072. The another input device 1072 may include but is not limited to a physical keyboard, a function key (such as a volume control key or an on/off key), a trackball, a mouse, and a joystick. Details are not described herein again.

Optionally, the touch panel 1071 may cover the display panel 1061. When detecting a touch operation on or near the touch panel 1071, the touch panel 1071 transmits the touch operation to the processor 110 to determine a type of a touch event. Then, the processor 110 provides corresponding visual output on the display panel 1061 based on the type of the touch event. Although in FIG. 9, the touch panel 1071 and the display panel 1061 act as two separate parts to implement input and output functions of the UE 100, in some embodiments, the touch panel 1071 and the display panel 1061 may be integrated to implement the input and output functions of the UE 100. This is not specifically limited herein.

The interface unit 108 is an interface for connecting an external apparatus to the UE 100. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, an earphone port, and the like. The interface unit 108 may be configured to receive input (for example, data information and power) from the external apparatus, and transmit the received input to one or more elements of the UE 100, or may be configured to transmit data between the UE 100 and the external apparatus.

The memory 109 may be configured to store software programs and various data. The memory 109 may mainly include a program storage area and a data storage area. The program storage area may store an operating system, an application (for example, a sound play function or an image play function) required for at least one function, and the like. The data storage area may store data created based on use of the mobile phone (for example, audio data and a phone book), and the like. In addition, the memory 109 may include a high-speed random access memory, and may further include a nonvolatile memory, for example, at least one disk storage device, a flash memory, or another volatile solid-state storage device.

The processor 110 is a control center of the UE 100, and is connected to all components of the UE 100 by using various interfaces and lines. By running or executing a software program and/or module that is stored in the memory 109 and calling data stored in the memory 109, the processor 110 executes various functions of the UE 100 and processes data, so as to perform overall monitoring on the UE 100. The processor 110 may include one or more processing units. Optionally, the processor 110 may be integrated with an application processor and a modem processor. The application processor mainly processes an operating system, a user interface, an application, and the like, and the modem processor mainly processes wireless communication. It can be understood that the above-mentioned modem processor may not be integrated in the processor 110.

The UE 100 may further include the power supply 111 (for example, a battery) supplying power to each component. Optionally, the power supply 111 may be logically connected to the processor 110 by using a power management system, so that functions such as charge and discharge management and power consumption management are implemented by using the power management system.

In addition, the terminal device 100 includes some function modules not shown, and details are not described herein.

Figure 10:
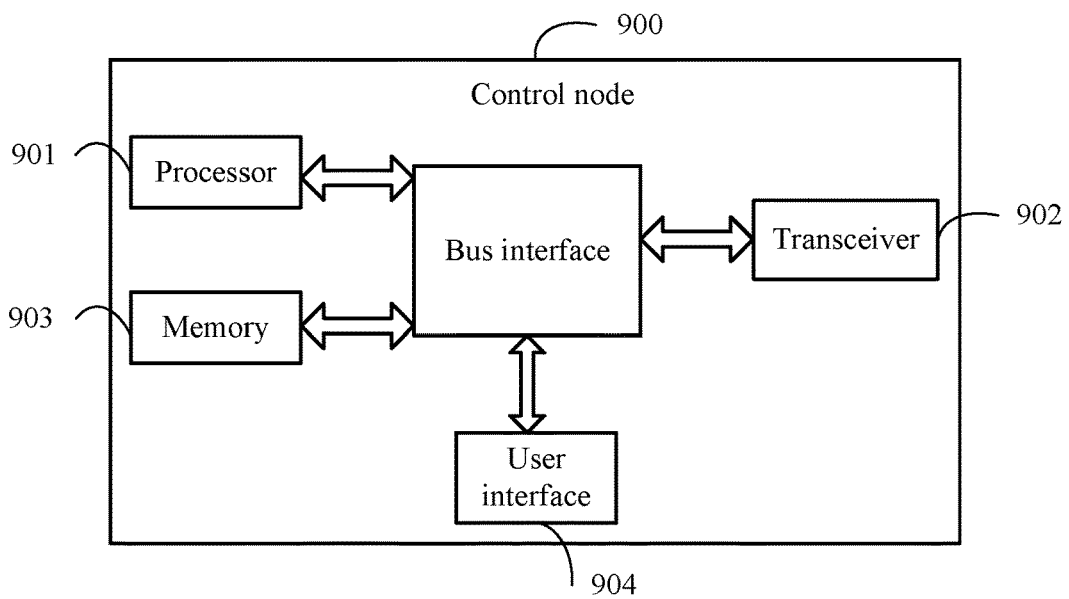
FIG. 10 is a second schematic structural diagram of a control node according to an embodiment of the present disclosure.

FIG. 10 is a schematic structural diagram of hardware of a control node according to an embodiment of the present disclosure. The control node 900 includes a processor 901, a transceiver 902, a memory 903, a user interface 904, and a bus interface.

The transceiver 902 is configured to send scheduling information to user equipment UE. The scheduling information is used to schedule a data carrier in a carrier aggregation scenario to transmit sidelink data, and/or the scheduling information is used to schedule a feedback carrier to transmit feedback data. The feedback data is used to indicate a transmission result of the sidelink data.

The control node provided in this embodiment of the present disclosure can send scheduling information to UE. The scheduling information is used to instruct the UE to perform sidelink data transmission in a carrier aggregation scenario, and instruct the UE to perform feedback data transmission in the carrier aggregation scenario. In this way, after scheduling information is exchanged between transmit-end UE and receive-end UE, the transmit-end UE and the receive-end UE can learn a specific carrier on which sidelink data is transmitted and a specific carrier on which feedback data is transmitted. Therefore, the transmit-end UE and the receive-end UE can have consistent understandings of sidelink transmission, which can resolve a problem that NACK-only broadcast fails because a carrier monitored by the transmit-end UE do not match a carrier monitored by the receive-end UE. In addition, the control node can configure, for UE, unicast, multicast, or broadcast CA transmission on a sidelink, to meet corresponding service requirements. Moreover, because a plurality of carriers can be scheduled by using one carrier to transmit sidelink data, and feedback data of sidelink data on all carriers can be transmitted by using one carrier, overheads on a control channel (for example, a PSCCH or a PSFCH) can be reduced, thereby improving spectrum efficiency and data throughput, and resolving a problem of half-duplex caused when a plurality of carriers receive and send different physical channels at the same time.

In this embodiment of the present disclosure, in FIG. 10, a bus architecture may include any quantity of interconnected buses and bridges, and is specifically linked by various circuits of one or more processors represented by the processor 901 and a memory represented by the memory 903. The bus architecture may further link various other circuits such as those of a peripheral device, a voltage regulator, and a power management circuit. These are well known in the art, and therefore are not further described in this specification. The bus interface provides an interface. The transceiver 902 may be a plurality of components. To be specific, the transceiver 902 includes a transmitter and a receiver, and provides a unit configured to communicate with various other apparatuses on a transmission medium. For different user equipment, the user interface 904 may alternatively be an interface for externally and internally connecting a required device. The connected device includes but is not limited to: a keypad, a display, a loudspeaker, a microphone, a joystick, and the like. The processor 901 is responsible for managing the bus architecture and common processing, and the memory 903 may store data used when the processor 901 performs an operation.

In addition, the control node 900 may further include some functional modules not shown. Details are not described herein again.

Optionally, an embodiment of the present disclosure further provides a terminal device, including a processor, a memory, and a computer program that is stored in the memory and executable on the processor. When the computer program is executed by the processor, the process of the data transmission method shown in the foregoing embodiments is implemented, and a same technical effect can be achieved. To avoid repetition, details are not described herein.

Optionally, an embodiment of the present disclosure further provides a network device, including a processor, a memory, and a computer program stored in the memory and executable on the processor. When the computer program is executed by the processor, the processes of the data transmission method in the foregoing embodiments is implemented, and same technical effects can be achieved. To avoid repetition, details are not described herein.

An embodiment of the present disclosure further provides a non-transitory computer-readable storage medium, where the non-transitory computer-readable storage medium stores a computer program. When the computer program is executed by a processor, a plurality of processes of the data transmission method in the foregoing embodiments is implemented, and the same technical effects can be achieved. To avoid repetition, details are not described herein again. The non-transitory computer-readable storage medium is, for example, a read-only memory (ROM), a random access memory (RAM), a magnetic disk, or an optical disc.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. Without more restrictions, an element defined by a phrase "including a . . . " does not exclude presence of other identical elements in the process, method, article, or apparatus that includes the very element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to existing technologies may be implemented in a form of a software product. The computer software product is stored in a storage medium (for example, a ROM/RAM, a magnetic disk, or an optical disc) and includes several instructions for instructing a terminal device (which may be a mobile phone, a computer, a server, an air conditioner, or a network device) to execute the methods described in a plurality of embodiments of the present disclosure.

The embodiments of the present disclosure are described above with reference to the accompanying drawings, but the present disclosure is not limited to the foregoing implementations. The foregoing implementations are only illustrative rather than restrictive. Inspired by the present disclosure, a person of ordinary skill in the art can still derive many variations without departing from the essence of the present disclosure and the protection scope of the claims. All these variations shall fall within the protection of the present disclosure.

What is claimed is:

1. A method for data transmission through scheduling a carrier, comprising:

transmitting, by a user equipment (UE) in a carrier aggregation scenario based on scheduling information, sidelink data on a data carrier and feedback data on a feedback carrier, wherein the scheduling information is used to schedule at least one of the data carrier or the feedback carrier, and the feedback data is used to indicate a transmission result of the sidelink data; wherein a scheduling carrier carrying the scheduling information is different from a part of or all of data carriers, or the scheduling carrier is same as the data carrier; or the scheduling carrier carrying the scheduling information is same as the feedback carrier, or the scheduling carrier is different from a part of or all of feedback carriers;

wherein the scheduling carrier carrying the scheduling information comprises at least one of: a primary component carrier of the UE, a carrier used to perform radio link monitoring (RLM), a carrier used to transmit sidelink radio resource control (RRC) signaling, a carrier associated with a preset quality of service (QoS), a carrier used to transmit a synchronizing signal, a carrier used to transmit a discovery signal or channel, or a carrier used for radio resource management (RRM).

2. The method according to claim 1, wherein before the transmitting, by UE in a carrier aggregation scenario based on scheduling information, sidelink data on a data carrier, and transmitting feedback data on a feedback carrier, the method further comprises:

receiving, by the UE, the scheduling information from a control node.

3. The method according to claim 1, wherein before the transmitting, by UE in a carrier aggregation scenario based on scheduling information, sidelink data on a data carrier, and transmitting feedback data on a feedback carrier, the method further comprises:

obtaining, by the UE, configuration information, wherein the configuration information is used to configure at least one of: the feedback carrier, the data carrier, or a scheduling carrier carrying the scheduling information.

4. The method according to claim 3, wherein the configuration information is pre-configured, specified in a protocol, received from a control node, or configured based on a negotiation between UEs.

5. The method according to claim 1, wherein the scheduling information comprises first scheduling information, and the first scheduling information is used to schedule the feedback carrier, wherein the first scheduling information is used to indicate at least one of: second scheduling information, a resource location of the second scheduling information, a resource location of the sidelink data, first carrier indication information, second carrier indication information, third carrier indication information, a subcarrier spacing (SCS) of the data carrier, an SCS of the feedback carrier, an SCS of a scheduling carrier carrying the scheduling information, an extensible parameter set of the data carrier, an extensible parameter set of the feedback carrier, or an extensible parameter set of the scheduling carrier, wherein the second scheduling information is used to schedule the data carrier; the first carrier indication information is used to indicate the data carrier; the second carrier indication information is used to indicate the feedback carrier; and the third carrier indication information is used to indicate the scheduling carrier.

6. The method according to claim 1, wherein the scheduling information comprises second scheduling information, and the second scheduling information is used to schedule the data carrier; and the second scheduling information comprises at least one of: first carrier indication information, sidelink assignment index information, carrier total quantity information, carrier occupation information, indication information used to indicate a feedback channel carrying the feedback data, or information about offset between the feedback channel and a reference channel, wherein the first carrier indication information is used to indicate the data carrier; the sidelink assignment index information is used to indicate an index of each of at least one scheduling parameter; one scheduling parameter is used to schedule sidelink data on a part of or all of data carriers; the carrier total quantity information is used to indicate a carrier quantity of the data carrier; and the carrier occupation information is used to indicate whether data is transmitted on each data carrier.

7. The method according to claim 1, wherein the feedback carrier comprises at least one of: a primary component carrier of the UE, a carrier used to perform radio link monitoring (RLM), a carrier used to transmit sidelink radio resource control (RRC) signaling, a carrier associated with a preset quality of service (QOS), a carrier used to transmit a synchronizing signal, a carrier used to transmit a discovery signal or channel, or a carrier used for radio resource management (RRM).

8. A user equipment, comprising a processor, a memory, and a computer program stored in the memory and executable on the processor, wherein the computer program, when executed by the processor, causes the user equipment (UE) to perform:

transmitting, in a carrier aggregation scenario based on scheduling information, sidelink data on a data carrier and feedback data on a feedback carrier, wherein the scheduling information is used to schedule at least one of the data carrier or the feedback carrier, and the feedback data is used to indicate a transmission result of the sidelink data; wherein a scheduling carrier carrying the scheduling information is different from a part of or all of data carriers, or the scheduling carrier is same as the data carrier; or the scheduling carrier carrying the scheduling information is same as the feedback carrier, or the scheduling carrier is different from a part of or all of feedback carriers;

wherein the scheduling carrier carrying the scheduling information comprises at least one of: a primary component carrier of the UE, a carrier used to perform radio link monitoring (RLM), a carrier used to transmit sidelink radio resource control (RRC) signaling, a carrier associated with a preset quality of service (QOS), a carrier used to transmit a synchronizing signal, a carrier used to transmit a discovery signal or channel, or a carrier used for radio resource management (RRM).

9. The user equipment according to claim 8, wherein the computer program, when executed by the processor, causes the UE to further perform:

receiving the scheduling information from a control node.

10. The user equipment according to claim 8, wherein the computer program, when executed by the processor, causes the UE to further perform:

obtaining configuration information, wherein the configuration information is used to configure at least one of: the feedback carrier, the data carrier, or a scheduling carrier carrying the scheduling information.

11. The user equipment according to claim 10, wherein the configuration information is pre-configured, specified in a protocol, received from a control node, or configured based on a negotiation between UEs.

12. The user equipment according to claim 8, wherein the scheduling information comprises first scheduling information, and the first scheduling information is used to schedule the feedback carrier, wherein the first scheduling information is used to indicate at least one of: second scheduling information, a resource location of the second scheduling information, a resource location of the sidelink data, first carrier indication information, second carrier indication information, third carrier indication information, a subcarrier spacing (SCS) of the data carrier, an SCS of the feedback carrier, an SCS of a scheduling carrier carrying the scheduling information, an extensible parameter set of the data carrier, an extensible parameter set of the feedback carrier, or an extensible parameter set of the scheduling carrier, wherein the second scheduling information is used to schedule the data carrier; the first carrier indication information is used to indicate the data carrier; the second carrier indication information is used to indicate the feedback carrier; and the third carrier indication information is used to indicate the scheduling carrier.

13. The user equipment according to claim 8, wherein the scheduling information comprises second scheduling information, and the second scheduling information is used to schedule the data carrier; and the second scheduling information comprises at least one of: first carrier indication information, sidelink assignment index information, carrier total quantity information, carrier occupation information, indication information used to indicate a feedback channel carrying the feedback data, or information about offset between the feedback channel and a reference channel, wherein the first carrier indication information is used to indicate the data carrier; the sidelink assignment index information is used to indicate an index of each of at least one scheduling parameter; one scheduling parameter is used to schedule sidelink data on a part of or all of data carriers; the carrier total quantity information is used to indicate a carrier quantity of the data carrier; and the carrier occupation information is used to indicate whether data is transmitted on each data carrier.

14. The user equipment according to claim 8, wherein the feedback carrier comprises at least one of: a primary component carrier of the UE, a carrier used to perform radio link monitoring (RLM), a carrier used to transmit sidelink radio resource control (RRC) signaling, a carrier associated with a preset quality of service (QOS), a carrier used to transmit a synchronizing signal, a carrier used to transmit a discovery signal or channel, or a carrier used for radio resource management (RRM).

15. A control node, comprising a processor, a memory, and a computer program stored in the memory and executable on the processor, wherein the computer program, when executed by the processor, causes the control node to perform:
- sending scheduling information to user equipment (UE), wherein
- the scheduling information is used to schedule at least one of a data carrier in a carrier aggregation scenario to transmit sidelink data or a feedback carrier to transmit feedback data; and the feedback data is used to indicate a transmission result of the sidelink data; wherein
- a scheduling carrier carrying the scheduling information is different from a part of or all of data carriers, or the scheduling carrier is same as the data carrier; or
- the scheduling carrier carrying the scheduling information is same as the feedback carrier, or the scheduling carrier is different from a part of or all of feedback carriers;
- wherein the scheduling carrier carrying the scheduling information comprises at least one of: a primary component carrier of the UE, a carrier used to perform radio link monitoring (RLM), a carrier used to transmit sidelink radio resource control (RRC) signaling, a carrier associated with a preset quality of service (QOS), a carrier used to transmit a synchronizing signal, a carrier used to transmit a discovery signal or channel, or a carrier used for radio resource management (RRM).

16. The control node according to claim 15, wherein the computer program, when executed by the processor, causes the control node to further perform:
- sending configuration information to the UE, wherein
- the configuration information is used to indicate at least one of: the feedback carrier, the data carrier, or a scheduling carrier carrying the scheduling information.

17. The control node according to claim 15, wherein the scheduling information comprises first scheduling information, and the first scheduling information is used to schedule the feedback carrier, wherein
- the first scheduling information is used to indicate at least one of: second scheduling information, a resource location of the second scheduling information, a resource location of the sidelink data, first carrier indication information, second carrier indication information, third carrier indication information, an subcarrier spacing (SCS) of the data carrier, an SCS of the feedback carrier, an SCS of a scheduling carrier carrying the scheduling information, an extensible parameter set of the data carrier, an extensible parameter set of the feedback carrier, or an extensible parameter set of the scheduling carrier, wherein the second scheduling information is used to schedule the data carrier; the first carrier indication information is used to indicate the data carrier; the second carrier indication information is used to indicate the feedback carrier; and the third carrier indication information is used to indicate the scheduling carrier.

18. The control node according to claim 15, wherein the scheduling information comprises second scheduling information, and the second scheduling information is used to schedule the data carrier; and
- the second scheduling information comprises at least one of: first carrier indication information, sidelink assignment index information, carrier total quantity information, carrier occupation information, indication information used to indicate a feedback channel carrying the feedback data, or information about offset between the feedback channel and a reference channel, wherein
- the first carrier indication information is used to indicate the data carrier; the sidelink assignment index information is used to indicate an index of each of at least one scheduling parameter; one scheduling parameter is used to schedule sidelink data on a part of or all of data carriers; the carrier total quantity information is used to indicate a carrier quantity of the data carrier; and the carrier occupation information is used to indicate whether data is transmitted on each data carrier.

19. The control node according to claim 15, wherein the feedback carrier comprises at least one of: a primary component carrier of the UE, a carrier used to perform radio link monitoring (RLM), a carrier used to transmit sidelink radio resource control (RRC) signaling, a carrier associated with a preset quality of service (QOS), a carrier used to transmit a synchronizing signal, a carrier used to transmit a discovery signal or channel, or a carrier used for radio resource management (RRM).

* * * * *